United States Patent
Fukakusa et al.

(10) Patent No.: US 6,757,224 B2
(45) Date of Patent: Jun. 29, 2004

(54) INTEGRATED OPTICAL COMPONENT AND OPTICAL PICK-UP DEVICE

(75) Inventors: Masaharu Fukakusa, Tamana (JP); Shogo Horinouchi, Fukuoka (JP); Hiroshi Goto, Munakata (JP); Fuminobu Furukawa, Onoji (JP)

(73) Assignee: Matsushita Electric Industrial Co., Ltd., Oska (JP)

( * ) Notice: Subject to any disclaimer, the term of this patent is extended or adjusted under 35 U.S.C. 154(b) by 308 days.

(21) Appl. No.: 09/961,526

(22) Filed: Sep. 25, 2001

(65) Prior Publication Data

US 2002/0039330 A1 Apr. 4, 2002

(30) Foreign Application Priority Data

Sep. 29, 2000 (JP) ........................................ 2000-299778

(51) Int. Cl.[7] ................................................. G11B 7/00
(52) U.S. Cl. ............................... 369/44.12; 369/44.23; 369/112.01
(58) Field of Search ........................... 369/44.11, 44.12, 369/44.14, 44.23, 44.27, 44.28, 44.37, 108, 109.01, 110.01, 112.01, 112.03, 112.27

(56) References Cited

U.S. PATENT DOCUMENTS

| | | | |
|---|---|---|---|
| 5,144,603 A | * | 9/1992 | Mozume et al. .......... 369/44.14 |
| 5,151,892 A | | 9/1992 | Kimura |
| 5,696,748 A | | 12/1997 | Yoshikawa |
| 5,712,841 A | * | 1/1998 | Opheij et al. .......... 369/112.09 |
| 2001/0043535 A1 | | 11/2001 | Fukakusa et al. |

FOREIGN PATENT DOCUMENTS

| | | |
|---|---|---|
| JP | 02166630 | 6/1990 |
| JP | 09198706 | 7/1997 |
| JP | 9237434 | 9/1997 |
| JP | 1049904 | 2/1998 |
| JP | 10049904 | 2/1998 |
| JP | 10154344 | 6/1998 |
| JP | 11283271 | 10/1999 |
| JP | 11283272 | 10/1999 |

* cited by examiner

*Primary Examiner*—Muhammad Edun
(74) *Attorney, Agent, or Firm*—Stevens, Davis, Miller & Mosher, LLP (57) ABSTRACT

Provided are an integrated optical component which can prevent a detection optical system being affected by variation in working temperature, and a pick-up device using the integrated optical component. The integrated optical component for guiding a light beam emitted from a light emitting element to an optical disc, and for separating a required light beam from reflected light from the optical disc, wherein the integrated optical component includes therein a plurality of optical surfaces, and a diffraction grating for extracting light beams required from tracking control and focus control, from the reflected light is formed in any one of the optical surfaces.

38 Claims, 7 Drawing Sheets

INTEGRATED OPTICAL COMPONENT AND OPTICAL PICK-UP DEVICE

BACKGROUND OF THE INVENTION

1. Field of the Invention

The present invention relates to an optical component used for recording and reproducing signals to and from an optical disc, an optical pick-up device using the optical component, and an optical disc apparatus using the optical pick-up device.

2. Description of Related Art

As to conventionally used optical pick-up devices, there has been used several kinds of beam splitters in order to contrive the isolation between a light emitting source and an optical detecting system. By the way, since demands for miniaturizing optical pick devices has been increased, there are such a trend that optical units in which a light source and an optical detecting system are packed in one and the same package have been produced.

In order to materialize the above-mentioned optical unit, an optical component formed thereon with diffraction gratings have been used. Japanese Laid-Open Patent No. H10-154344 discloses in detail the technical configuration of the optical component as an example. Thus, since such an optical component has been materialized, the optical pick-up device has become small-sized, and accordingly, small-sized optical disc apparatus each incorporating a small-sized optical pick-up device have been commercially available.

By the way, the miniaturization and widespread of optical disc apparatus have caused new problems. For example, the miniaturization inevitably causes a light emitting source, a detecting element and an optical component are arranged in close proximity with one another. Further, the long time use thereof and enlargement of utilization thereof for recording causes the optical output power of the light emitting source to be increased, and as well the working temperature thereof is also raised. Further, similar to note-book type personnel computers which have been widespreadly used, the use of the optical component in a small-sized housing causes the environmental temperature to rise up further.

As the working temperature range in which optical units should be used is enlarged, affection by thermal expansion coefficients of components constituting the optical unit comes into force. For example, should the dimensions and positions of the optical components which are formed thereon diffraction gratings be affected, the provability of such a fact that servo control causes errors or offsets would become higher.

The present invention is devised in order to solve the above-mentioned problems, and accordingly, an object of the present invention is to provide an integrated optical component with which variation in working temperature does not affect an optical detecting system which can realize detection of signals which can hardly be affected by cross-talk, and also provide an optical pick-up device using the integrated optical component, and an optical disc apparatus using the optical pick-up device.

SUMMARY OF THE INVENTION

To the end, according to the present invention, there is provided an integrated optical component for guiding an optical emitting beam from an optical emitting element to an optical disc, and for picking up required beams from reflection light from the optical disc, incorporating therein a plurality of optical surfaces any one of which is formed thereon with a diffracting grating for extracting optical beams required for tracking control and focusing control, from the reflection light.

Further, there are provided an optical pick-up device using the above-mentioned integrated optical component, and an optical disc apparatus using the optical pick-up device.

DESCRIPTION OF THE PREFERRED EMBODIMENTS

Explanation will be made of embodiments of the present invention with reference to the drawings.

(Embodiment 1)

Figure 1:
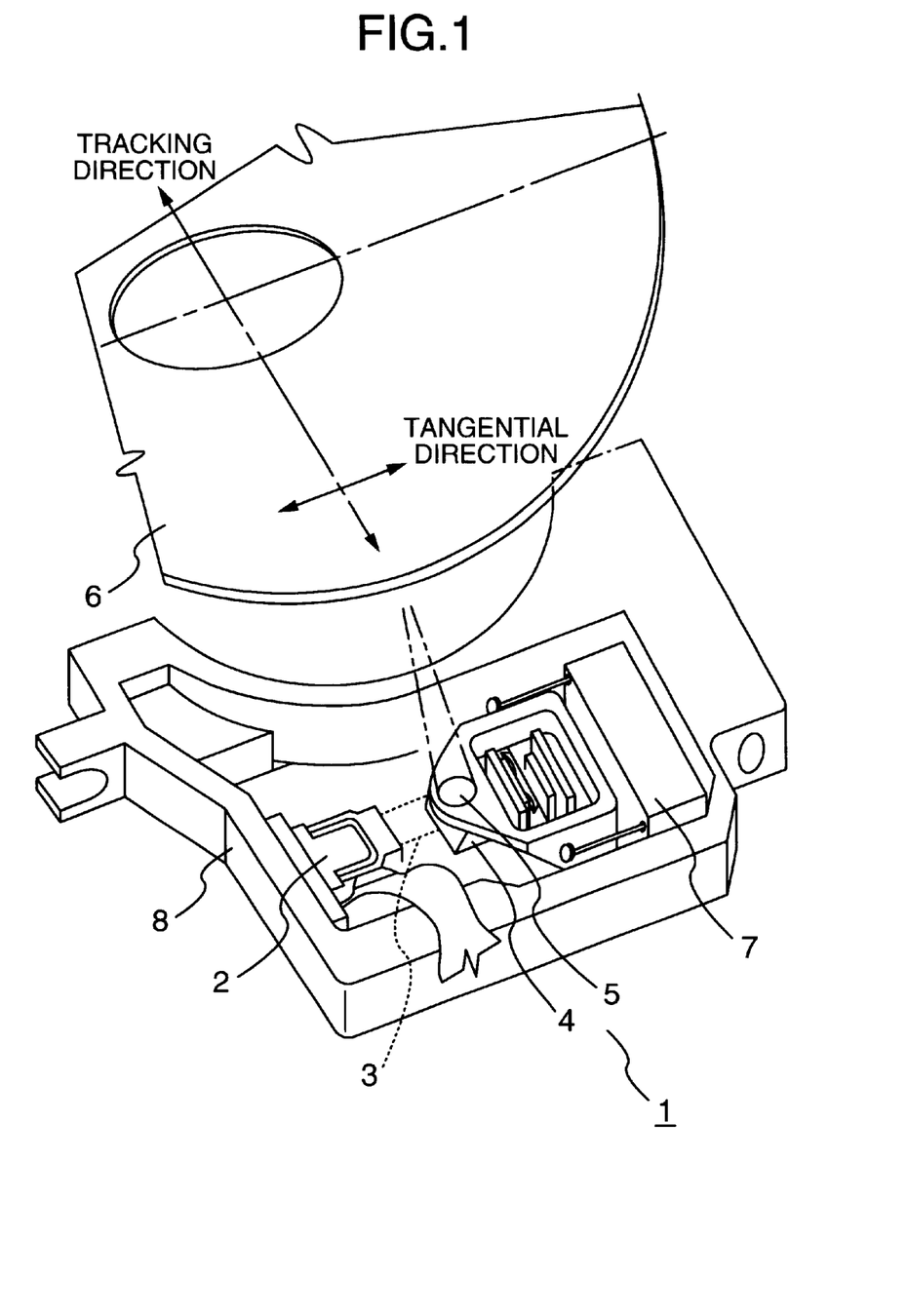
FIG. 1 is a perspective view illustrating an overall optical pick-up device.

Referring to FIG. 1 which is a perspective view illustrating an optical pick-up in its entirety, the optical pick-up 1 which is generally denoted by 1, is composed of main components as described below. A composite element 2 emits an optical beam 3 which is deflected into a different direction by a mirror 4 and is converged by an objective lens 5 into a focus point on a data recording layer of an optical disc 6. Light reflected from the recording layer reversely guided and is then detected by the composite element 2.

Meanwhile, the data recoding layer of the optical disc 6 is formed thereon with data tracks which are concentric with one other (or in a spiral form in strictly speaking). Accordingly, such a configuration is taken that the optical beams (red, green and yellow light beams, which will be detailed later) 3 emitted from the composite element 2 are arranged, being tangential to the optical disc 6 (tangential to any of the data tracks). An actuator 7 supports the objective lent 5 which is therefore displaceable slightly in order to focus the optical beam 3 on the data recording layer of the optical disc 6 and to carry out a slight trace (tracking) in the direction of the tracks. The composite element 2, the mirror 4, the objective lens 5 and the actuator 7, mentioned above, are mounted on a carriage 8. With this arrangement, the carriage 8 is displaced in its entirety radially of the optical disc 6 so as to cope with a displacement exceeding the tracking range.

Figure 2:
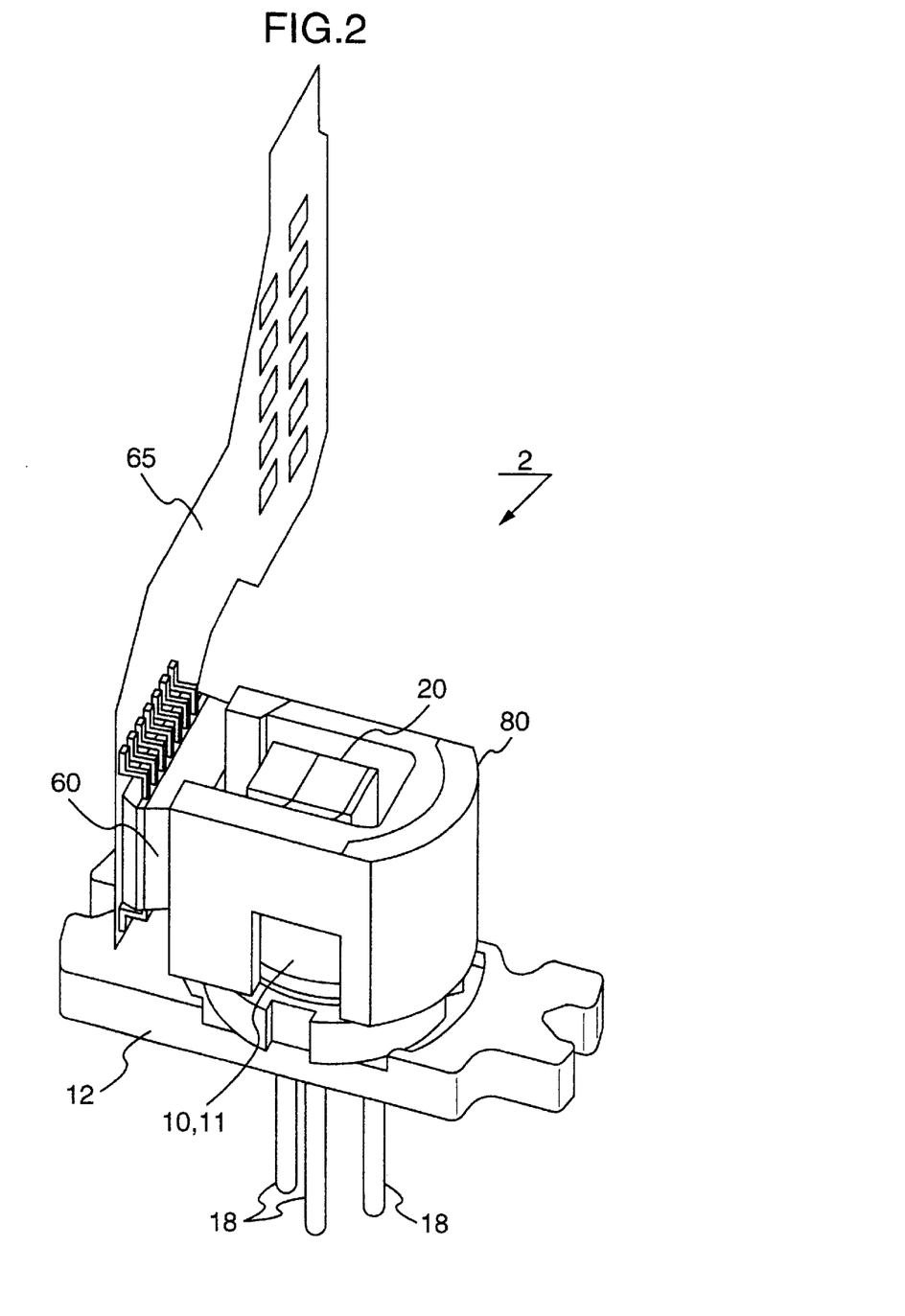
FIG. 2 is a perspective view illustrating an overall composite element.

Next, explanation will be made of the composite element 2 with reference to FIG. 2 which is a perspective view illustrating the composite element 2 in its entirety. The composite element 2 is composed of a light source 10, an integrated optical component 20, an optical receiver 60 and a coupling member 80. These will be explained in detail in the mentioned order.

At first, the light source 10 is composed of a general purpose semiconductor laser 11 fixed to a base member 12.

Since this semiconductor laser 11 which is most expensive among the indispensable components of the optical pick-up 1, is commercially available easily, and can be purchased inexpensively, an inexpensive optical pick-up 1 can be provided.

Figure 7:
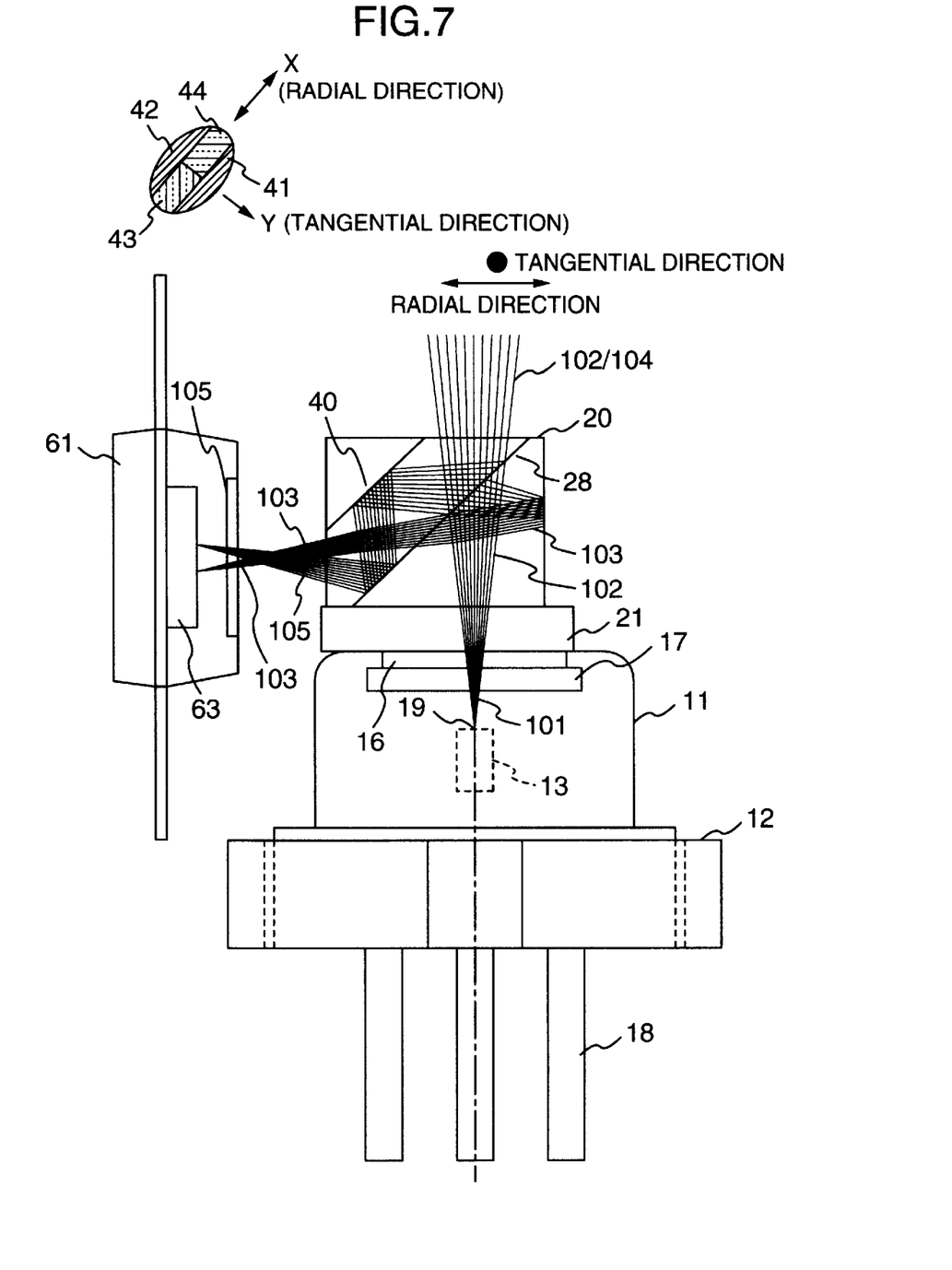
FIG. 7 is a view for explaining the operation of the composite element.

It is noted that although detailed description will be omitted, the semiconductor laser 11 incorporates, of course, a laser element 13 having a geometrical light emitting point 19 adapted to be used for imaginary optical simulation (Refer to FIG. 7). A laser beam emitted from the light emitting point 19 of the leaser element 13 passes through an emitting outlet 16 of the semiconductor laser 11. Further, there are shown leads 18 of the light emitting diode laser 11, and a flexible cable 65 for connection to the optical receiver 60.

Figure 3:
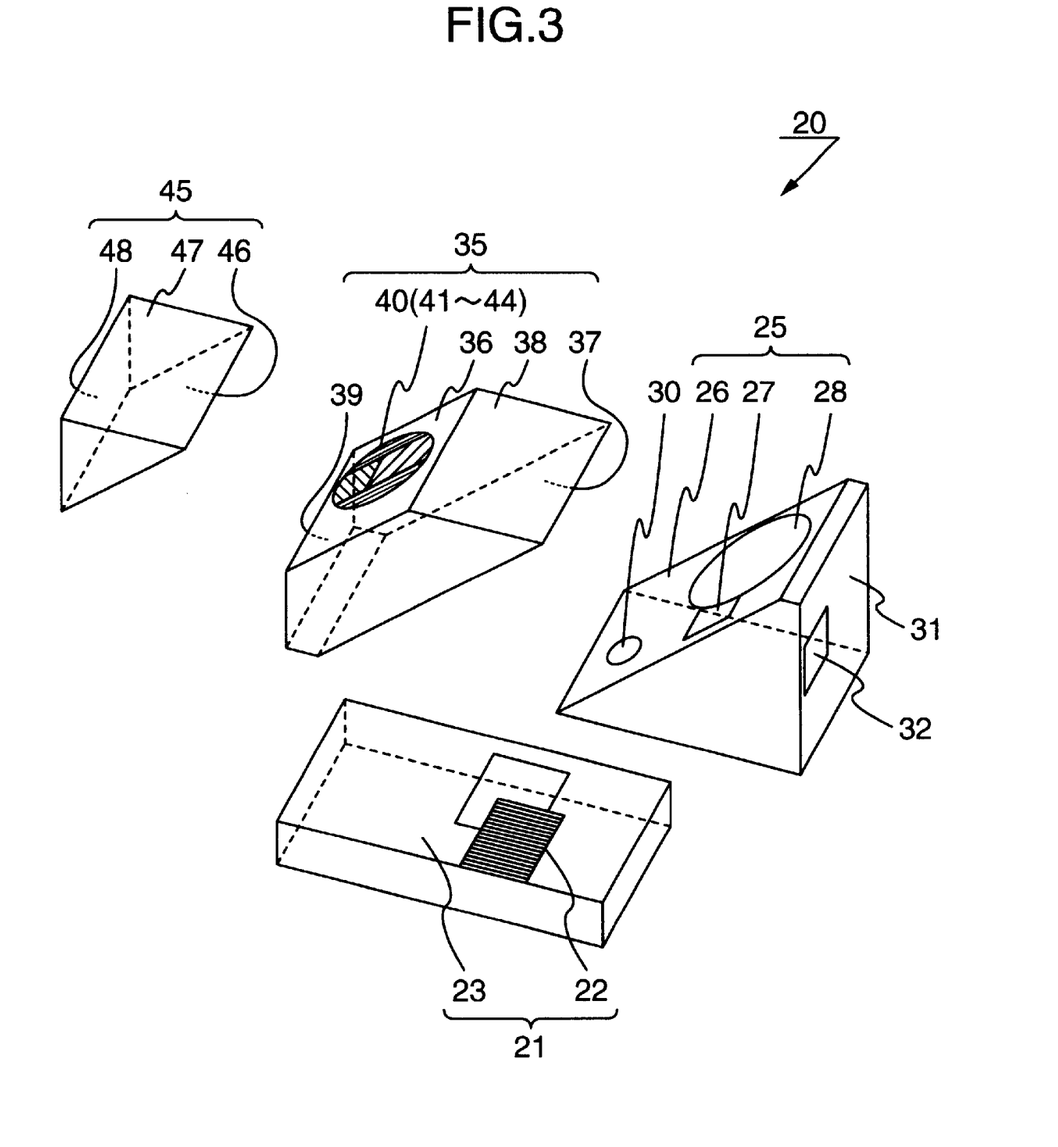
FIG. 3 is an exploded perspective view illustrating an integrated optical component.

Next, explanation will be made of the integrated optical component 20 which is a main subject of the present invention. Referring to FIG. 3 which is an exploded perspective view illustrating the integrated optical component 20, the integrated optical component 20 is composed of first to fourth light guide members 21, 25, 34, 45. The light guide members 21, 25, 34, 45 may be made of highly transparent resin or optical glass.

The first light member 21 is formed in a parallel plate shape. The first optical guide member 21 is formed at its surface opposed to the emitting outlet 16, with a first diffracting grating 22 for producing main and auxiliary beams (which will be referred to as 3 beams) using diffracted zero-order and ±first-order light beams and used for tracking control. With this arrangement, pitches and a depth of the first diffracting gratings 22 are set to optimum values, depending upon wave lengths and respective optical powers of the 3 beams. There is shown an optical absorption film 23 for preventing light such as diffused reflection light which is not required, and stray light from being incident upon the integrated optical component 20.

The second optical guide member 25 is formed in a substantially trigonal pole shape, having a substantially right triangle cross-sectional shape. The second optical guide member 25 is formed at its slant surface 26 in the trigonal pole shape with a second diffraction grating 27 (out-going light detecting means) within a predetermined zone. The second diffraction grating 27 is fabricated in the same way as that by which the first diffraction grating 22 is fabricated. Since the light beam which enters into the second optical guide member 25 from the first optical guide member 21 is diffused light, it is reflected by the second diffraction grating 27 and as well, it is converted into a converged light beam in order to be image-formed on an optical power detecting means 66 (which will be detailed with reference to FIG. 5). Further, the setting condition of the pitches and depth of the second diffraction gratings 27 is similar to that of the first diffraction grating. It is noted that the second diffraction grating 27 is configured so that the +first order light becomes a main component of the reflected diffraction light. Large volume of light is converged by the optical power detecting means 66 so as to increase the optical power to be detected in order to expect precise detection of the optical power.

Further, the slant surface 26 is coated thereover with a go-and-return path separating film 28 in its entirety including the second diffraction grating 27. The go-and-return path separating film 28 has a function which allows the light beam (out-going path) entering from the first optical guide member 21 to transmit therethrough by about 100%, but to cause a light beam (in-coming path) reflected from the optical disc 6 and returned to the second guide member 25 to be reflected by about 100%.

A side surface 31 which is the other surface of the second optical guide member 25 is formed in its predetermined zone thereon with a side surface reflecting film 32 by which diffracted light reflected by the second diffraction grating 27 is reflected again so as to be focused on the light power detecting means 66. It is noted that during formation of the integrated optical component 20, the side surface 31 including the side surface reflecting film 32 is coated thereover with a light absorbing film in its entirety in order to absorb unnecessary internally reflected light and to prevent ingress of stray light and further in order to protect the reflecting film coating from the surrounding which causes corrosion.

The third optical guide member 35 is formed in a trapezoidal block-like shape having a substantially trapezoidal cross-sectional shape, and having a first slant surface 36, a second slant surface 37, a transparent surface 38 and an egress surface 39. The first slant surface 36 and the second slant surface 37 are opposed parallel surfaces which are in parallel with each other, and the first slant surface 36 is formed thereon with a third diffraction grating 40 in a predetermined zone. The fabrication and the setting conditions, such as the pitches and depth, of the third diffraction grating 40 are similar to those of the first diffraction grating 22.

The third optical guide member 35 is joined thereto with the second optical guide member 25, and accordingly, in-coming light reflected by the go-and-return path separating film 28 is incident upon the third diffraction grating 40. Further, the light is turned by the third diffraction grating 40 into a reflected +one-order diffraction light which is then directed to the second optical guide member 25, but is again reflected by an auxiliary reflecting film 30 which is formed on the slant surface 26 and which will be described later and is then emitted from the egress surface 39, being directed toward the optical power detecting means 66. In this arrangement, it is effective to form the auxiliary reflecting film 30 in that part on the slant surface 26 which corresponds to such a zone that the reflected diffraction light is reflected by the go-and-return path separating film 28 (that is, the layer between the corresponding zone of the slant surface 26 and the layer of the go-and-return path separating film 28). Thus, the reflecting function of the go-and-return path separating film 28 can be enhanced, and accordingly, it is possible to restrain variation of the level of signal detection of the optical power detecting means 66.

The light guide member 45 is formed in a substantially trigonal pole having a right-angled triangular cross-sectional shape, having a slant surface 46, a first surface 47 and a second surface 48. The first surface 47 and the second surface 48 are orthogonal to each other, serving as reference surfaces for the integrated optical component 20. The slant surface 46 is formed thereon with a light absorbing film over its entirety.

Figure 4:
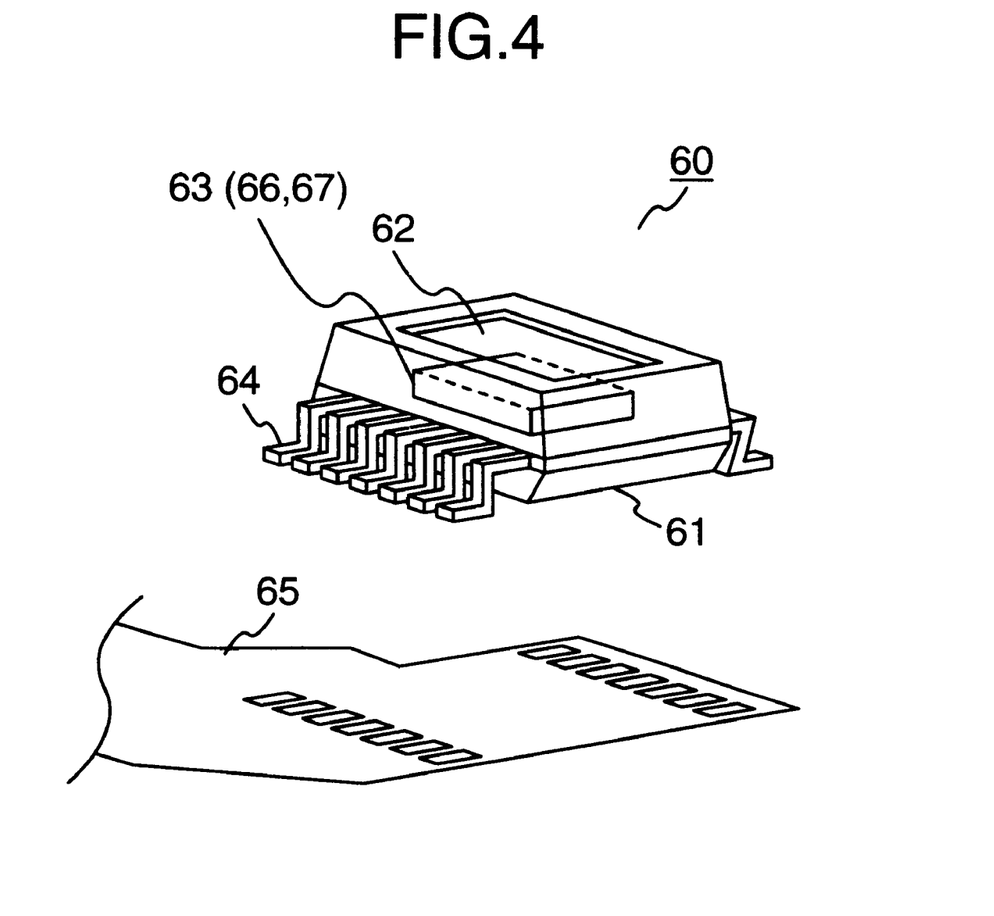
FIG. 4 is a perspective view illustrating an overall optical receiver.

Referring to FIG. 4 which is a perspective view illustrating an optical receiver 60 in its entirety, an OE element 63 is accommodated in a package 61 having an ingress opening 62. Signal terminals of the OE element 63 are connected to lead terminals 64 so that signals therefrom are led outside. Further, the lead terminals 64 are connected to the flexible cable 65 so that the OE element can be tested or mounted.

Figure 5:
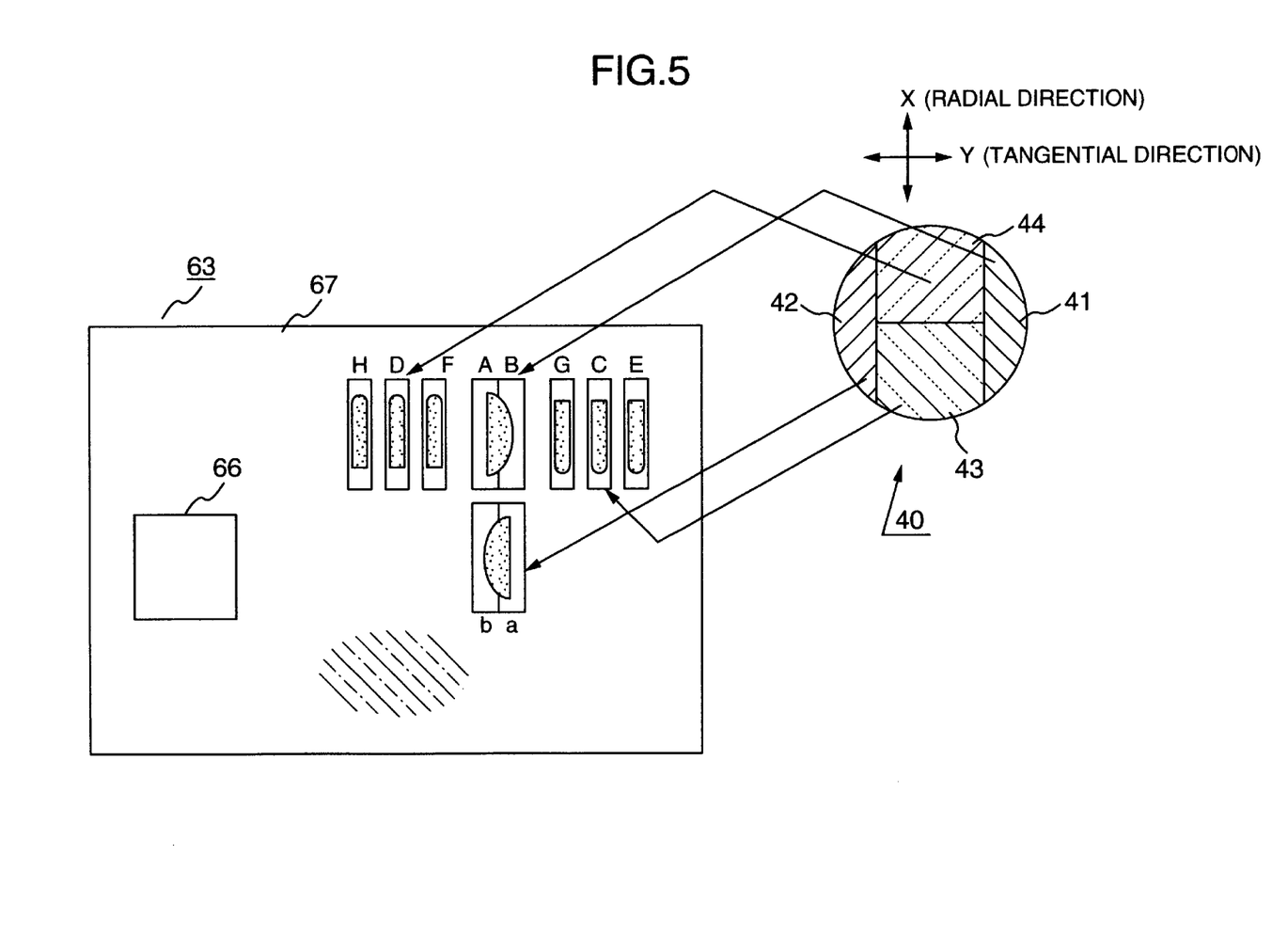
FIG. 5 is a view illustrating a pattern of an OE element as viewed from an incident opening.

Referring to FIG. 5 which is a view illustrating a pattern of the OE element as viewed from the ingress opening 62, there are shown an OE element pattern 66 corresponding to the above-mentioned optical power detecting means, and OE patterns 67 corresponding to a light receiving element, and consisting of ten patterns in total. It is noted that zones exhibited by dots on the OE elements exhibits such situations that light diffracted by the third diffraction grating 40 is incident.

The light receiving means 67 is composed of eight OE elements for light receiving elements in the tangential direction, that is, light receiving means 67E, 67C, 67G, light receiving means 67A arranged in the center part, and then, light receiving means 67F, 67D, 67H, which are arranged in the mentioned order, and two OE element patterns for light receiving means 67a, 67b which are radially shifted from those in the center part. Upon the four OE patterns in the center part, the main beam reflected by the disc is incident, after being diffracted by a grating A41 and a grating B42. The OE elements in the center part are named in the reverse order, for carrying out signal process and electrical wiring which will be explained later. Upon the light receiving means 67E, 67C, 67G, an auxiliary beam reflected by the disc is incident after it is diffracted by grating C43. Similarly, upon the light receiving means 67F, 67D, 67H, another auxiliary beam reflected by the disc is incident after it is diffracted by grating D44.

On the optical power detecting means 66, reflected +one-order diffraction light of the above-mentioned out-going light reflected by the side surface reflecting film 32 formed on the second optical guide member 25, in a zone which does not contribute to recording and reproduction, is focused. Of the above-mentioned in-coming light, +1-order diffraction light reflected by the third diffraction grating 40 is focused on the light receiving means 67. These OE elements 63 produce detection currents corresponding to received light volumes, which are taken up in the form of electric signals by means of amplifiers which are not shown and which are connected at a posterior stage.

Explanation will be made of the relationship between the third diffraction grating 40 and the 10 OE elements of the light receiving means 67 (A to H, a, b) with reference to FIG. 5. The third diffraction grating 40 is composed of four kinds of grating zones. At first, the third diffraction grating 40 is divided into three parts by two division lines which are parallel with each other and with the radial (X-axial) direction of the optical disc 6, One of arcuated zones divided in the tangential direction (which is tangential to the tracks, that is, Y-axial) serves as the grating A41, and the other one of them serves as the grating B42, the area of the grating A41 is equal to that of the grating B42, and corresponds to ¼ of the total zone area of the third diffraction grating 40 (the sum of the areas of the grating A41 and the grating B42 corresponds to about ½ of the total zone area of the third diffraction grating 40).

The reflected diffraction light from the grating A41 is focused on the light receiving means 67A and the light receiving means 67B provided in the center part of the light receiving means 67. Further, a zone where the reflected light diffracted by the grating B42 is focused is focused on the light receiving means 67a and the light receiving means 67b which are provided in the lower part of the center part of the light receiving means 67. That is, it serves as a main beam for focus detection. It is noted as shown in FIG. 5 that the light receiving means 67A and the light receiving means 67B in the center part are arranged in the order reverse to the order of arrangement of the light receiving means 67a, 67b provided in the lower part of the center part of the light receiving means 67. Blank zones arranged on the left and right sides of the light receiving means 67A, 67B, 67a, 67b, are those where the auxiliary beams produced by the first diffraction grating 33 are imaged by the grating A41 and the grating B42. That is, three beams produced by the first diffraction grating 22, are turned into in-coming three beams by reflection on the disc surface, and are incident upon the third diffraction grating 40. Of these three in-coming beams, the diffraction light of only the main beam is focused on the light receiving means 67A, 67B, 67a, 67b.

By now using a mark I which denotes a detection current subjected to OE conversion, currents IA, IB, Ia, Ib are obtained by the light receiving means. Thus, the following logic of the detection currents can be configured for focus detection, that is, as the focus error (which will be abbreviated and referred to "FE") detection logic, $$FE=\{(IA+Ia)-(IB+Ib)\}$$  Eq. 1 is obtained. Further, the light receiving means 67A and the light receiving mans 67B may be connected on the OE element 63 and the sum of these light receiving means may be newly exhibited as IA. Similarly, the light receiving means 67B and the light receiving means 67b may be connected. As a result, the sum of the light receiving means 67B and 67b may be newly exhibited as IB. Accordingly, it is substituted in Eq. 1, $$FE=IA-IB$$  EQ. 2 can be obtained

The EF detection logic by EQ. 2 offers the following effects. The gratings A41 and the grating B42 are of arcuated zones opposed to each other in the tangential direction of the third diffraction grating 40. Accordingly, if the integrated optical component 20 causes thermal expansion, being affected by the heat radiation of the laser element 13, the gratings A41, B42 causes largest positional variation by the affection of the thermal expansion since these are arranged far from the center part. However, The light receiving means 67A, 67B and the light receiving members 67a, 67b are arranged in the orders reverse to each other, and are summed, and accordingly, a difference of reverse order sum (diagonally differential) is used as the FE detection logic. Thus, drifts and offsets of detection signals caused by the above-mentioned positional variation can be cancelled out as understood from EQ. 2.

Further, the remaining divided zone, that is, the center divided zone is further divided into two zones by a division line in parallel with the tangential direction (tangential to the tracks, that is, Y-axial), that is, the grating C43 and the grating D44 are formed. The zones of the gratings D43 and the grating D44 are formed in a D-like shape. In other words, the division lines of the third diffraction grating 40 constitute an H-like pattern. The area of the grating C43 is equal to that of the grating D44, corresponds to about ¼ of the total zone area of the third diffraction grating 40 (that is, the area of each of the gratings A41 to D44 corresponds to ¼ of the total zone area of the third diffraction grating 40).

By configuring the areas of the gratings A41 to D44 as mentioned above, the power of the light beam which is incident upon each of the gratings A41 to D44 is integrated over its area, and accordingly, the respective zones can receive optical powers which are equal to one another.

The diffraction light of the in-coming three beams diffracted by the grating C43, is similarly focused on the light receiving means 67C, the light receiving means 67E and the light receiving means 67G which are provided on one side of the light receiving means 67. Further, similarly, diffraction light of the in-coming three beams diffracted by the grating D44, is focused on the light receiving means 67D, the light receiving means 67F and the light receiving means 67H provided on the other side of the light receiving means 67. These six kinds of light receiving zones are detected for tracking control in the form of 3 beams.

Similar to the above-mentioned FE detection logic, detection currents obtained by the six kinds of zones can be logically configured. That is, as to the detection logic of tracking errors (which will be abbreviated and referred to as "TE"), $$TE=IC-ID-k\{(IE+IG)-(IF+IH)\} \quad \text{EQ. 3}$$

can be obtained, where K is a constant which can be determined in accordance with operation setting.

The TE logic by EQ. 3 offers the following effects. First the light receiving means 67C, 67D detect the main beam, and accordingly, the first term and the second term of EQ. 3 exhibit normal TE detection.

Second, the third term between the larger brackets exhibits that it causes differential operation by obtaining the sum of detection currents of the auxiliayr beams which are obtained from the grating C43 and the grating D44 of the third diffraction grating 40. Thus, similar to the FE detection logic, drifts and offsets of detection signals which are caused by the above-mentioned positional variation can be cancelled by EQ. 3.

In particular, since the grating A41 and the grating B42 are separated in the arcuated zones, respectively, the incident shape for the sensor areas of the light receiving means 67A and the light receiving means 67B, and the light receiving means 67a and the light receiving means 67b, which are bi-split light receiving means can be distributed with no loss. Similarly, since the grating C43 and the grating D44 have a D-like shape, the incident shape for the sensor areas of the light receiving means 67C to 67H can be also distributed with no loss. In addition, since the areas of the gratings A41 to D44 are configured so that the total zone area of the third diffraction grating 40 is divided into four zones, the third diffraction grating can be easily formed.

Further, with the above-mentioned configuration of zone division of the diffraction grating, $$(IA+IB)+(Ia+Ib)\approx(IC+ID) \quad \text{EQ. 4}$$

is obtained, and accordingly, the optical power can be fed being well-balanced for the detection of RF signals and the detection of the FE signal and the TE signal.

Now detailed explanation will be made of the operational setting in this embodiment. The constant k is obtained by the following equation $$K=(IC+ID)/(IE+IF+IG+IH) \quad \text{EQ. 5}$$

and the degree of amplification with which each of the light receiving means is subjected to OE conversion is adjusted so as to normally set k to $k\approx 1.0$. It is noted that the three beams produced by the first diffraction grating 22 are adjusted to so as to have a rate with which the optical power of the 0 order main beam is set to 10 while the optical power of the ±1 order auxiliary beams is set to 1.

Accordingly, the ratio of the optical powers is substituted in the light receiving means in EQ. 5, and then, in order to satisfy such a condition as $k\approx 1.0$, the degree of amplification of the light receiving means 67E, 67F, 67G and 67H is set to be about 5 times as large as that of the light receiving means 67A, 67B.

However, the zones where the auxiliary beams are to be detected are likely to be affected by cross-talk, and accordingly there would cause a risk of lowering of the SN ratio of the TE signal or increase of servo-offset. Thus, it is desirable to adjust the degree of amplification without being increased to up to a value five times as large as that of the light receiving means 67A, 67B.

Figure 6:
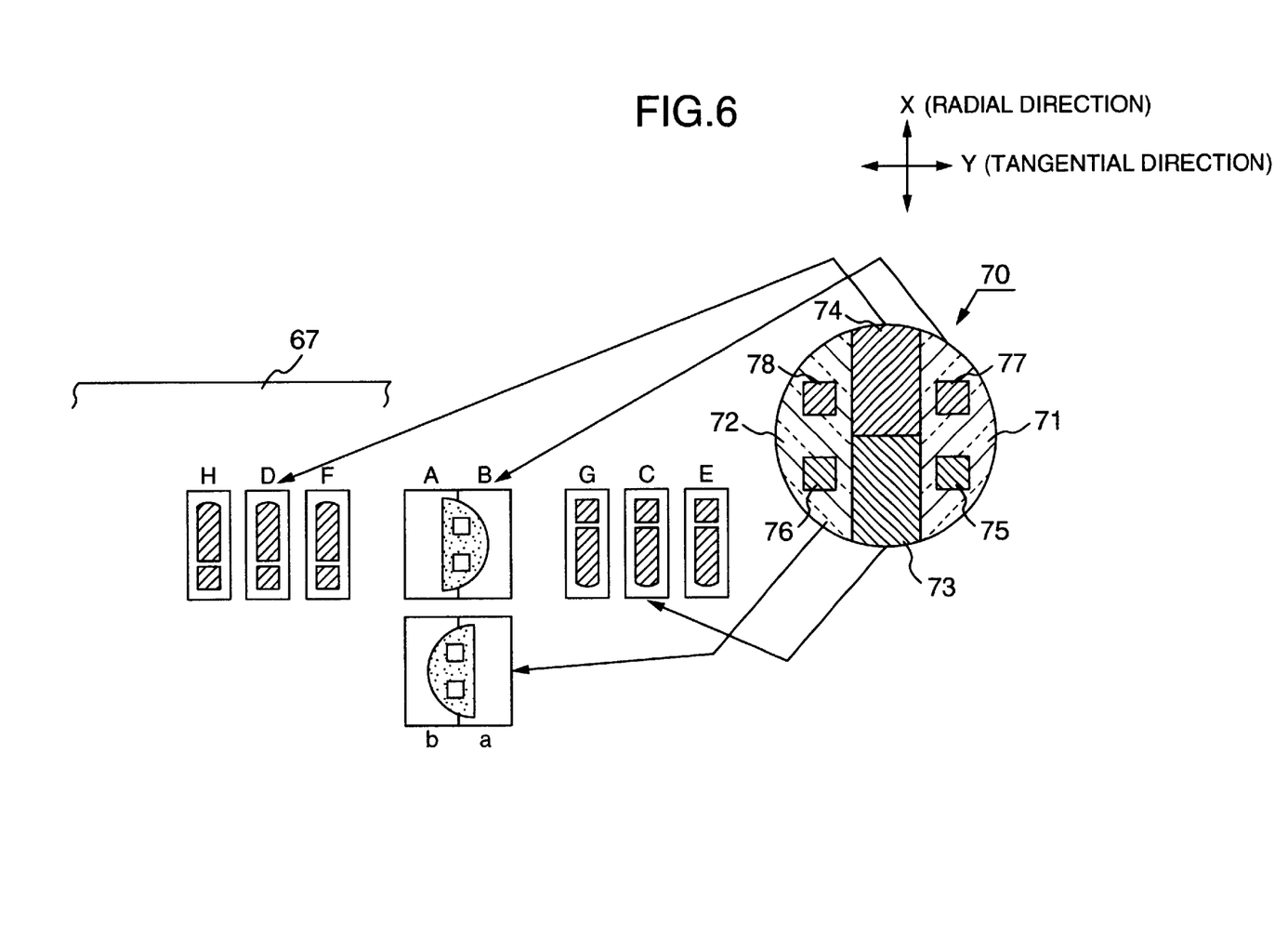
FIG. 6 is a view for explaining the relationship between a variant form of the grating and the OE element.

Accordingly, in order to satisfy the above-mentioned conditions, explanation will be made of variant forms of the gratings A41 to D44 which effectively utilize the features of the three beams. Referring to FIG. 6 which is a view for explaining the variant forms of the gratings and the OE elements, there are shown a third diffraction grating 70 which corresponds to the third diffraction grating 40 as shown FIGS. 3 and 5, a light receiving means 67 which is the same as that shown in FIG. 5, and gratings A71, B72, C73 and D74 which correspond to the gratings A41 to D44 shown in FIG. 5. The directions (the radial direction X and the tangential direcdtion Y) of the division lines for the gratings A71 to D74 are also similar to those shown in FIG. 5, except the following points:

The separating grating A75 corresponding to the grating C73 is provided in the zone of the grating A71. Similarly, the separating grating B76 corresponding to the grating C73 is provided in the zone of the grating B72 while the separating grating C77 corresponding to the grating D78 is provided in the zone of the grating A71, and the separating grating D74 corresponding to the grating D74 is provided in the zone of the grating B72. Further, the separating grating A75 to D78 are configured so that the grating C73, the separating grating A75 and the separating grating B76 diffract light in one and the same direction (in other words, at one and the same position of the OE element), and the grating D74, the separating grating C77 and the separating gratings D78 diffract light in one and the same direction (in order words, at one and the same position of the OE element). The areas of the separating gratings A75 to D78, and conditions of diffracting optical powers thereof are all the same.

The above-mentioned conditions are applied to the detection signals so as to verify the operation thereof. As mentioned above, since the grating C73, the separating grating A75 and the separating grating B76 diffract light in one and the same direction, the diffraction light of the main beam by the grating C73 is incident upon the light receiving means 67C. Simultaneously, the diffraction light of the main beam by the separating grating A75 and the separating grating B76 is incident upon the light receiving means 67C. Similarly, diffraction light of ±1-order auxiliary beams is incident upon the light receiving means 67E, 67G, respectively. Similarly, since the grating D74, the separating grating C77 and the separating grating D78 diffract light in one and the same direction, diffraction light of the main beam by the grating D74 is incident upon the light receiving means 67D. Further, simultaneously, the diffraction light of the main beam by the separating grating C77 and the separating grating D78 is incident upon the light receiving means 67D. Similarly, diffraction light of ±1-order auxiliary beams is incident upon the light receiving means 67F, 67H.

In consideration with the above-mentioned incident conditions, the FE signal in the Eq. 1 and EQ. 2 does not affect the FE detecting function since the areas where the separating gratings are formed are equal to one another. The TE signal in EQ. 3 does not affect the TE detecting function since the areas where the separating gratings are formed are equal to one another for the first and the second terms and as well the third term between the larger brackets.

Next, EQ. 4 will be verified. Since the separating gratings A75 to D78 correspond to the peripheral zones of the third diffraction grating 70, respectively, they less affect upon the zero-order main beam, and accordingly, conditions of the EQ. 4 can be maintained with substantially no affection. In EQ. 5, similarly, the numerator can be maintained with substantially no affection. Meanwhile, the optical powers of the ±1-order auxiliary beams are added with the optical powers from the separating gratings A75 to D78 in addition to the optical powers of the grating C73 and the grating D74.

The denominator is increased. As a result, the degrees of amplification of the light receiving means 67E, 67F, 67G and 67H can be set to be relatively smaller than a value which is 5 times as large as that of the light receiving means 67A, 67B (Refer to examplnation relating to EQ. 5). Accordingly, the detecting operation of signals which can hardly be subjected to affection by cross-talk.

Explanation will be made of the operation of the overall composite element 20 which is configured as mentioned above with reference to FIG. 7 which is a view for explaining the operation of the composite element 2. First, the leads 18 are connected in a desired manner, and the laser element 13 emits diffused light 101 from its light emitting point 19, and the light 101 passes through a cover glass 17, and is then incident upon the first optical guide member 21.

In the first optical guide member 21, unnecessary disturbance light and light diverged exceeding a predetermined diffusion angle are absorbed by the light absorbing film 23, and the diffused light 101 is converted into the three beams of out-going light 102 by the first diffraction grating 22.

The out-going light 102 is incident upon the second light guide member 25 from the first light guide member 21. The out-going light 102 passing through the second guide member 25 comes to the slant surface 26. A substantial volume of the out-going light 102 transmits through the go-and-return pass separating film 28, and is then incident upon the third optical guide member 35. Further, it transmits through the transparent surface 38 of the third guide member 35, and is then deflected in its way by the mirror 4, and is then turned into converged light by the objective lens 5 before it is incident upon the optical disc 6.

That part of the out-going light 102 which comes to the slant sufarce 26, which is diffused light and which is in the zone that does not contribute to recording and reproduction is incident upon the second diffraction grating 27. Further, it is turned into a monitoring reflected diffraction light 103 of the converged light which is then advanced to the side surface reflecting film 32 where it is again reflected, and then it transmits through the second optical guide member 25 and the third optical guide member 35, and is emitted from the egress surface 39. The monitoring reflected diffraction light 103 is focused on the optical power detecting means 66 of the light receiver 60. Thus, since a part of the out-going light 102 in the zone which does not contribute to recording and reproduction can be used for detecting an optical power, an optical power which is precisely proportional to the optical power of the laser element 13 can be detected, and further, a front monitor type pick-up which does not exert affection by a light volume to the inherent reproduction and recording and which is extremely excellent can be provided.

Next, the in-coming light 102 reflected from the recording layer of the optical disc 6 passes through the objective lens 5 and by way of the mirror 4 in the reverse order and is incident upon the transparent surface 38 of the third optical guide member 35. The in-coming light 104 is reflected by the go-and-return path separating film 28, and is advanced to the third diffraction grating 40 of the third optical guide member 35 in which it is turned into a reflected in-coming diffraction light 105 composed of +1-order diffraction light as a main component. The reflected in-coming diffraction light 105 is again reflected by the auxiliary reflecting film 30 of the second optical guide member 25, and is then emitted from the egress surface 39 and toward the optical receiver 60. Further, the reflected in-coming diffraction light 105 reflected from the grating zone of each of the gratings A41 to D44 is focused on each of the light receiving means 67A to 67H. Thus, detection signals from the light receiving means 67A to 67H are combined so as to carry out the focus control and the tracking control.

As detailed hereinabove, the optical pick-up device according to the present invention, can be assembled in a small-size at a low cost by using a general-purpose light emitting element with a high degree of accuracy. As well, an optical pick-up device which can precisely and efficiently detect an optical power of the light emitting element can be provided.

Further, even though the integrated optical component is affected by a heat from a laser element so as to cause thermal expansion, since the outputs of the light emitting means which are arranged in reversed orders are summed, and since a difference of the reverse order sum (diagonal differential operation) is used as FE detection logic, drift or offset of a FE detection signal which is caused by a positional variation due to a thermal expansion, can be cancelled out by EQ. 2. Similarly, drift or offset of a TE detection signal caused by a positional variation due to thermal expansion is cancelled out by EQ. 3.

In particular, the grating A and the grating D are separated from each other and are arranged in the arcuated zones while the grating C and the grating D are separated from each other and are arranged in D-like shape zones, and accordingly, the incident shape for the sensor areas of the light receiving means can be distributed with no loss.

Further, since each of the areas of the gratings A to D is set to ¼ of the entire zone of the third diffraction grating, the diffraction layer can be easily formed. Further, The separating grating A76 and the separating grating B76 corresponding to the grating C73 are provided respectively in the zones of the grating A and the grating B, and the separating grating C and the grating D corresponding to the grating D74 are provided respectively in the zones of the grating A and the grating B.

Thus, it is possible to provide an integrated optical component which can carry out detecting operation of signals which can be hardly affected by cross-talk without the detection optical system being affected by variation in the working temperature, to provide an optical pick-up device using the integrated optical component and a disc apparatus using the optical pick-up device.

What is claimed is:

1. An integrated optical component for guiding a light beam, emitted from a light emitting element, to an optical disc and for separating a required light beam from reflected light from the optical disc, wherein said integrated optical component includes therein a plurality of optical surfaces and a diffraction grating, for extracting light beams required for tracking control and focus control from the reflected light, is formed in any one of the optical surfaces, wherein said diffraction grating is divided into three zones by two division lines parallel with a radial direction of the optical disc, that is, a center zone and two arcuated zones which are separated from each other in a tangential direction of the optical disc, and said center zone is further divided by a division line which is parallel with the tangential direction of the optical disc, into two D-like zones.

2. An integrated optical component as set forth in claim 1, wherein each of said two arcuated zones and said two D-like zones has an area which corresponds to about ¼ of the total area of the diffraction grating.

3. An integrated optical component for guiding a light beam, emitted from a light emitting element, to an optical disc and for separating a required light beam from reflected light from the optical disc, wherein said integrated optical component includes therein a plurality of optical surfaces and a diffraction grating, for extracting light beams required for tracking control and focus control from the reflected light, is formed in any one of the optical surfaces, wherein said diffraction grating is divided by division lines, which have an H-like pattern, into four zones each having about ¼ of the total zone area of the diffraction grating, including two arcuated zones and two D-like zones.

4. An integrated optical component as set forth in claim 1, wherein said two arcuated zones are formed therein with separating gratings for diffraction in the same direction as that of said D-like zones.

5. An integrated optical component as set forth in claim 3, wherein said two arcuated zones are formed therein with separating gratings for diffraction in the same direction as that of said D-like zones.

6. An optical pick-up device comprising a light emitting element, an integrated optical component for guiding a light beam emitted from a light emitting element to an optical disc and for separating a required light beam from reflected light from the optical disc, a light receiving means for receiving light so as to convert the light into an electric signal, and a coupling means for holding said light emitting element, said integrated optical component and the light receiving means at their respective positions; wherein said integrated optical component includes therein a plurality of optical surfaces and a diffraction grating, for extracting light beams required for tracking control and focus control from the reflected light, is formed in any one of the optical surfaces, wherein said diffraction grating is divided into three zones by two division lines parallel with a radial direction of the optical disc, that is, a center zone and two arcuated zones which are separated from each other in a tangential direction of the optical disc, and said center zone is further divided by a division line which is parallel with the tangential direction of the optical disc, into two D-like zones, each of the two arcuated zones and the two D-like zones having an area which is about ¼ of the total zone area of said diffraction grating.

7. An optical pick-up device as set forth in claim 6, wherein said two arcuated zones are formed therein with separating gratings for diffraction in the same direction as that of said D-like zones.

8. An optical disc apparatus using an optical pick-up device stated in claim 7.

9. An optical disc apparatus using an optical pick-up device stated in claim 6.

10. An optical disc apparatus using an optical pick-up device stated in claim 6.

11. An optical pick-up device comprising a light emitting element, an integrated optical component for guiding a light beam emitted from a light emitting element to an optical disc and for separating a required light beam from reflected light from the optical disc, a light receiving means for receiving light so as to convert the light into an electric signal, and a coupling means for holding said light emitting element, said integrated optical component and the light receiving means at their respective positions; wherein said integrated optical component includes therein a plurality of optical surfaces and a diffraction grating, for extracting light beams required for tracking control and focus control from the reflected light, is formed in any one of the optical surfaces, wherein said diffraction grating being divided by division lines, which have an H-like pattern, into four zones each having about ¼ of the total zone area of the diffraction grating, including two arcuated zones and two D-like zones.

12. An optical pick-up device as set forth in claim 11, wherein said two arcuated zones are formed therein with separating gratings for diffraction in the same direction as that of said D-like zones.

13. An optical disc apparatus using an optical pick-up device stated in claim 12.

14. An optical disc apparatus using an optical pick-up device stated in claim 11.

15. An optical pick-up device comprising a light emitting element, an integrated optical component for guiding a light beam emitted from a light emitting element to an optical disc and for separating a required light beam from reflected light from the optical disc, a light receiving means for receiving light so as to convert the light into an electric signal, and a coupling means for holding said light emitting element, said integrated optical component and the light receiving means at their respective positions, wherein said integrated optical component includes therein a plurality of optical surfaces and a diffraction grating, for extracting light beams required for tracking control and focus control from the reflected light, is formed in any one of the optical surfaces, said diffraction grating being tangentially divided into four zones including a first arcuated zone, a second arcuated zone, a first D-like zone, and a second D-like zone, and said light receiving means includes two light receiving means for receiving diffraction light from said first arcuated zone, two light receiving means for receiving diffraction light from said second arcuated zone, three light receiving means for receiving diffraction light from said first D-like zone, and three light receiving means for receiving diffraction light from said second D-like zone.

16. An optical pick-up device as set forth in claim 15, wherein a focus error (FE) signal is calculated from the following relation:

$$FE=\{(IA+Ia)-(IB+Ia)\}$$

where IA and IB are detection signals from the two light receiving means for receiving diffraction light from the first arcuated zone, Ia and Ib are detection signals from two light receiving means, arranged in an order reversed to that of the aforementioned two light receiving means, for receiving diffraction light from diffraction light from the second arcuated zone.

17. An optical disc apparatus utilizing an optical pick-up device stated in claim 16.

18. An optical pick-up device as set forth in claim 15, wherein a tracking error (TE) signal is calculated from the following relation $$TE=IC-ID-k\{(IE+IG)-(IF+IH)\}$$

where IC, IE, IG are detection signals from said three light receiving means for receiving diffraction light from the first D-like zone, ID, IF, IH are detection signals from the said three light receiving means for receiving diffraction light from the second D-like zone, and k is a constant which is determined in accordance with an operation setting.

19. An optical disc apparatus utilizing an optical pick-up device stated in claim 18.

20. An optical disc apparatus utilizing an optical pick-up device stated in claim 15.

21. A focus error detecting method in an optical pick-up device comprising an integrated optical component for guiding a light beam emitted from a light emitting element to an optical disc and for separating a required light beam from reflected light from the optical disc, and a light receiving means for receiving light so as to convert the light into an electric signal, said integrated optical component including therein a plurality of optical surfaces and a diffraction grating, for extracting light beams required for tracking control and focus control from the reflected light, being formed in any one of the optical surfaces, said diffraction grating being tangentially divided into four zones including a first arcuated zone, a second arcuated zone, a first D-like zone, and a second D-like zone, and said light receiving means including two light receiving means for receiving diffraction light from said first arcuated zone, two light receiving means for receiving diffraction light from said second arcuated zone, three light receiving means for receiving diffraction light from said first D-like zone, and three light receiving means for receiving diffraction light from said second D-like zone, wherein a focus error (FE) signal is calculated from the following relation:

$$FE=\{(IA+Ia)-(IB+Ia)\}$$

where IA and IB are detection signals from the two light receiving means for receiving diffraction light from the first arcuated zone, Ia and Ib are detection signals from two light receiving means, arranged in an order reversed to that of the aforementioned two light receiving means, for receiving diffraction light from the second arcuated zone.

22. A focus error detecting method in an optical pick-up device comprising an integrated optical component, for guiding a light beam emitted from a light emitting element to an optical disc and for separating a required light beam from reflected light from the optical disc, and a light receiving means for receiving light so as to convert the light into an electric signal, said integrated optical component including therein a plurality of optical surfaces and a diffraction grating, for extracting light beams required for tracking control and focus control from the reflected light, being formed in any one of the optical surfaces, said diffraction grating being tangentially divided into four zones including a first arcuated zone, a second arcuated zone, a first D-like zone, and a second D-like zone, and said light receiving means including two light receiving means for receiving diffraction light from said first arcuated zone, two light receiving means for receiving diffraction light from said second arcuated zone, three light receiving means for receiving diffraction light from said first D-like zone, and three light receiving means for receiving diffraction light from said second D-like zone, wherein a tracking error (TE) signal is calculated from the following relation $$TE=IC-ID-k\{(IE+IG)-(IF+IH)\}$$

where IC, IE, IG are detection signals from said three light receiving means for receiving diffraction light from the first D-like zone, ID, IF, IH are detection signals from the said three light receiving means for receiving diffraction light from the second D-like zone, and k is a constant which is determined in accordance with an operation setting.

23. An integrated optical component for guiding a light beam emitted from a light emitting element to an optical disc and for separating a required light beam from reflected light from the optical disc, the integrated optical component comprising a plurality of optical members which are joined to one another and among which at least first and second optical inclined parts are spaced apart from each other and are incorporated in the integral optical component, the first optical inclined part being provided with a go-and-return path separating member for transmitting therethrough at least a part of the light beam emitted from the light emitting element and reflecting at least a part of the reflected light from the disc and the second optical inclined part being provided with a diffraction grating for diffracting light transmitted from the go-and-return path separating member.

24. An integrated optical component as set forth in claim 23, wherein said diffraction grating is divided into three zones by two division lines parallel with a radial direction of the optical disc, that is, a center zone and two arcuate zones which are separated from each other in a tangential direction of the optical disc, and said center zone is further divided by a division line, which is parallel with the tangential direction of the optical disc, into two D-like zones.

25. An integrated optical component as set forth in claim 24, wherein each of said two arcuate zones and said two D-like zones has an area which corresponds to about ¼ of the total area of the diffraction grating.

26. An integrated optical component as set forth in claim 24, wherein said two arcuated zones are formed therein with separating gratings for diffraction in the same direction as that of said D-like zones.

27. An integrated optical component as set forth in claim 23, wherein said diffraction grating is divided by division lines, which have an H-like pattern, into four zones each having about ¼ of the total zone area of the diffraction grating, which comprises two arcuated zones and two D-like zones.

28. An integrated optical component as set forth in claim 27, wherein said two arcuated zones are formed therein with separating gratings for diffraction in the same direction as that of said D-like zones.

29. An optical pick-up device comprising a light emitting element, an integrated optical component for guiding a light beam emitted from a light emitting element to an optical disc and for separating a required light beam from reflected light from the optical disc, a light receiving means for receiving light so as to convert light into an electric signal, and a coupling means for holding said light emitting element, said integrated optical component and the light receiving means at their respective positions; wherein said integrated optical component comprises a plurality of optical members which are joined to one another and among which at least first and second optical inclined parts are spaced apart from each other and are incorporated in the integral optical component, the first optical inclined part being provided with a go-and-return path separating member for transmitting therethrough at least a part of the light beam emitted from the light emitting element and reflecting at least a part of the reflected light from the disc and the second optical inclined part being provided with a diffraction grating for diffracting light transmitted from the go-and-return path separating member and for extracting light beams required for tracking control and focus control from the reflected light.

30. An optical pick-up device as set forth in claim 29, wherein said diffraction grating is divided into three zones by two division lines parallel with a radial direction of the optical disc, that is, a center zone and two arcuate zones which are separated from each other in a tangential direction of the optical disc, and said center zone is further divided by a division line, which is parallel with the tangential direction of the optical disc, into two D-like zones, each of the two arcuate zones and the two D-like zones having an area which is about ¼ of the total zone area of said diffraction grating.

31. An optical pick-up device as set forth in claim 30, wherein said two arcuate zones are formed therein with separating gratings for diffraction in the same direction as that of said D-like zones.

32. An optical disc apparatus using an optical pick-up device stated in claim 31.

33. An optical disc apparatus using an optical pick-up device stated in claim 30.

34. An optical pick-up device as set forth in claim 29, wherein said diffraction grating is divided by division lines, having an H-like pattern, into four zones each having about ¼ of the total zone area of the diffraction grating, which comprises two arcuate zones and two D-like zones.

35. An optical pick-up device as set forth in claim 34, wherein said two arcuate zones are formed therein with separating gratings for diffraction in the same direction as that of said D-like zones.

36. An optical disc apparatus using an optical pick-up device stated in claim 35.

37. An optical disc apparatus using an optical pick-up device stated in claim 34.

38. An optical disc apparatus using an optical pick-up device stated in claim 29.

* * * * *